United States Patent
Rastl et al.

(10) Patent No.: US 9,061,593 B2
(45) Date of Patent: Jun. 23, 2015

(54) SLIDING STRIP FOR A SLIDING CONTACT DEVICE AND METHOD FOR PRODUCING A SLIDING STRIP

(75) Inventors: Hans Rastl, Bad Goisern (AT); Klaus Reiser, Bad Ischl (AT)

(73) Assignee: HOFFMANN & CO., ELEKTROKOHLE AG, Steeg (AT)

(*) Notice: Subject to any disclaimer, the term of this patent is extended or adjusted under 35 U.S.C. 154(b) by 36 days.

(21) Appl. No.: 13/640,185

(22) PCT Filed: Mar. 16, 2011

(86) PCT No.: PCT/EP2011/053998
§ 371 (c)(1),
(2), (4) Date: Nov. 15, 2012

(87) PCT Pub. No.: WO2011/128171
PCT Pub. Date: Oct. 20, 2011

(65) Prior Publication Data
US 2013/0048458 A1    Feb. 28, 2013

(30) Foreign Application Priority Data
Apr. 12, 2010  (DE) .................. 10 2010 003 874

(51) Int. Cl.
*B60L 5/08*    (2006.01)
*B60L 5/20*    (2006.01)

(52) U.S. Cl.
CPC ............. *B60L 5/205* (2013.01); *B60L 2200/26* (2013.01)

(58) Field of Classification Search
CPC .......... B60L 5/08; B60L 5/205; B60L 5/085; B60L 2200/26; B05D 3/12; B05D 5/12
USPC ........ 191/59.1, 49, 47, 59; 310/248, 251, 252
See application file for complete search history.

(56) References Cited

U.S. PATENT DOCUMENTS 2,636,856 A * 4/1953 Suggs et al. ............. 204/290.03
3,553,905 A * 1/1971 Lemelson ..................... 451/541
(Continued)

FOREIGN PATENT DOCUMENTS

| CN | 1329549 A | 1/2002 |
| CN | 1898103 A | 1/2007 |
| CN | 101580022 A | 11/2009 |

(Continued)

OTHER PUBLICATIONS

International SearchReport and Written Opinion as mailed on Sep. 25, 2011 for International Application PCT/EP2011/053998.
(Continued)

*Primary Examiner* — Mark Le
(74) *Attorney, Agent, or Firm* — Quarles & Brady LLP (57) ABSTRACT

A sliding strip and a method for producing a sliding strip for a sliding contact device which rests in a prestressed manner against an overhead wire includes a carbon molding and at least one metallic conduction device arranged in the carbon molding. The conduction device has at least one conduction layer extending on a plane transversely with respect to a sliding direction and in a direction of a prestressing force. The conduction device is formed by a layer of a metallic conductive material arranged on at least one flank of a slot which extends transversely with respect to the sliding direction in the carbon molding.

17 Claims, 5 Drawing Sheets

(56) References Cited

U.S. PATENT DOCUMENTS

| | | | |
|---|---|---|---|
| 7,972,198 | B2 | 7/2011 | Noishiki et al. |
| 2007/0072440 | A1* | 3/2007 | Spacie et al. ............... 439/1 |

FOREIGN PATENT DOCUMENTS

| | | |
|---|---|---|
| DE | 582118 C | 8/1933 |
| DE | 624930 C | 1/1936 |
| DE | 93 16 425 U1 | 1/1994 |
| DE | 44 41 339 A1 | 5/1996 |
| FR | 1110518 A | 2/1956 |
| FR | 2 838 390 A1 | 10/2003 |
| GB | 148529 | 11/1921 |
| JP | H0249301 U | 4/1990 |
| JP | H05130704 A | 5/1993 |
| JP | H05244703 A | 9/1993 |
| JP | 2005522830 A | 7/2005 |
| JP | 2007276039 A | 10/2007 |
| JP | 2008222547 A | 9/2008 |
| SU | 1 572 847 A1 | 6/1990 |

OTHER PUBLICATIONS

English Translation of the International Preliminary Report on Patentability, PCT/EP2011/053998, Dec. 13, 2012.

State Intellectual Property Office of People'S Republic of China, First Office Action and Search Report, Application No. 201180018803.4, Oct. 8, 2014, 13 pages [English Language Translation Only].

Japanese Patent Office, Notice of Reasons for Rejection, Patent Application No. 2013-504186, Jan. 27, 2015, 7 pages [English Language Translation Only].

* cited by examiner

SLIDING STRIP FOR A SLIDING CONTACT DEVICE AND METHOD FOR PRODUCING A SLIDING STRIP

CROSS-REFERENCE TO RELATED APPLICATIONS

This application represents the national stage entry of PCT International Application No. PCT/EP2011/053998 filed on Mar. 16, 2011 and claims the benefit of German Patent Application No. DE 10 2010 003 874.1 filed Apr. 12, 2010. The contents of both of these applications are hereby incorporated by reference as if set forth in their entirety herein.

STATEMENT REGARDING FEDERALLY SPONSORED RESEARCH OR DEVELOPMENT

Not applicable.

FIELD OF THE INVENTION

The present invention relates to a sliding strip for a sliding contact device that rests in prestressed manner against an overhead wire, particularly for supplying electrical power to rail vehicles, having a carbon molding and at least one metallic conductive device that is arranged in the carbon molding in order to locally increase electrical conductivity. The invention further relates to a method for producing such a sliding strip.

BACKGROUND OF THE INVENTION

In order to supply electricity to rail vehicles that are powered by electric motors, sliding contact devices, also referred to by the technical term "pantographs" and equipped with a sliding strip, are pressed as a wearing part against a drive power conductor (overhead wire) by a biasing force generated by the pantograph and form a sliding contact, thereby enabling electric current to be conducted while the vehicle is travelling.

In order to ensure that the sliding contacts between the sliding strip and the overhead wire are maintained as continuously as possible even during the dynamic travelling operation of such rail vehicles, it is known to be advantageous to keep the mass inertia forces of the pantograph, of which the mass of the sliding member is an essential component, as low as possible. At the same time, in order to enable the effective operation of vehicles powered with electric motors, it is necessary to ensure that the sliding strip is sufficiently capable of conducting electricity and that it has low electrical resistance. For this reason, impregnating the porous carbon with a metal has proven to be unsatisfactory, since the good electrical conductivity achieved thereby is associated with an undesirable increase in the mass of the sliding strip due to the metal component formed in the sliding strip by the impregnation.

Given this state of the prior art, it has therefore already been suggested in EP 1 491 385 A1 to implement measures that enable a low specific electrical resistance, that is to say good electrical conductivity in the sliding strip, while at the same time keeping its density as low as possible, which equates to a correspondingly low mass of the sliding strip.

As a solution to this problem, it is suggested in EP 1 491 385 A1 to manufacture sliding strips from a composite material that has a sandwich structure of carbon layers, between each of which are arranged metal meshes that extend in a plane transverse to the sliding direction of the sliding strip and in the biasing direction of the biasing force that is exerted on the sliding strip by the sliding contact device.

The manufacture of the known sliding strip has proved to be relatively complex because of its sandwich construction as described in the preceding, because individual carbon layers must be manufactured first, then the previously described sandwich construction must be created by arranging the metal meshes between the individual carbon layers, and only then can a composite body or carbon moulded body be produced that in its entirety forms the sliding strip.

SUMMARY OF THE INVENTION

The object of the present invention is therefore to suggest a sliding strip and a method for manufacturing a sliding strip, both of which enable a sliding strip to be manufactured more easily. In order to solve this object, in one embodiment, the sliding strip includes a carbon molding and at least one conduction device. The conduction device has at least one conduction layer that extends in a plane transverse to the sliding direction and in the direction of the biasing force, and that is formed by a layer of a metallic conductive material that is arranged on at least one flank of a slot that extends transversely to the sliding direction in the carbon molding.

With the design of the sliding strip according to the invention, it is possible to manufacture the sliding strip from a carbon mould that is constructed as a single part, which is furnished with slots in order to define the desired orientation of the conduction device in the carbon molding. The design of the conduction device as a conductive layer itself enables the locally increased electrical conductivity to be generated easily in the carbon molding by the formation of a slot in the carbon molding that has at least one flank provided with a layer of a metallic conductive material.

In this way, it is possible to produce a sliding strip that may be manufactured without the need to create a multilayer composite. Instead, the spatially defined arrangement of the conduction device is created simply by the formation of the slot or slots in the carbon molding. In order to create the conduction device itself, all that then needs to be done is to provide a flank that has been defined by the slot with a layer of a metallic conductive material.

The slot is preferably formed between continuous frontal edges of the carbon molding extending in the sliding direction, so that the carbon molding may be constructed as a single part throughout the entire manufacturing process.

In the simplest embodiment thereof, the conduction layer may be produced for example by impregnating the slot flank with a metallic conductive material, so that the slot itself remains uncovered. This particularly yields additional advantageous effects, because the slot ensures improved heat dissipation from the sliding strip when it is in operation, and it is possible to prevent the sliding strip from becoming overheated even when it is exposed to high currents.

The advantageous design of a conduction layer based on a slot formed in the carbon molding also makes it possible to produce the conduction layer by applying a coating, that is to say making a deposit of a metallic material, on the surface of the slot flank.

Particularly for the purposes of manufacturing the sliding strip simply, it has proven advantageous if the conduction layer is formed by filling the slot with a metallic conductive material, since this offers the possibility of producing the conduction layer by immersing the carbon molding furnished with slots in a metal bath.

In order to produce a conduction layer having particularly good conductivity, it is advantageous if the metallic conductive layer consists essentially of aluminium or copper.

It is particularly advantageous for the purpose of continuous formation of increased electrical conductivity in the sliding strip if the slot in the carbon molding is conformed continuously in the direction of the biasing force.

In order to create a larger contact surface between the overhead wire and the conductive material, it is advantageous if the carbon molding has a plurality of slots extending in the longitudinal direction of the carbon molding.

If the carbon molding in constructed with several rows of slots, each including a plurality of slots extending in the longitudinal direction of the carbon molding, the individual slots may be relatively short.

Alternatively, the carbon molding may have a plurality of slots extending diagonally with respect to the longitudinal direction of the carbon molding and arranged parallel to each other.

If the sliding strip is made up of a plurality of sliding strip segments, which have frontal edges extending at an angle to the sliding direction to form segment ends that overlap each other in the sliding direction, relatively small autoclaves that are long enough to manufacture the sliding strip segments may be used to manufacture sliding strips, so that equipment costs for production may be kept correspondingly low.

With the method for manufacturing a sliding strip according to the invention, the conduction device is produced in the carbon molding by creating at least one slot extending transversely to the sliding direction and in the direction of the prestressing force in a first method step and by creating a conduction layer on at least one flank of the slot in a subsequent method step.

The method according to the invention enables the production of a sliding strip based on a carbon molding, so that all that needs to be done afterwards to manufacture the sliding strip is to create at least one slot and subsequently form a conduction layer on a flank of the slot. It is particularly advantageous if a metallic conductive material is applied to a flank of the slot to create the conduction layer. Alternatively, the conduction layer may also be created by filling the slot with a metallic conductive material. Regardless of whether the conduction layer is created in the surface of the flank or on the surface of the flank, or whether the conduction layer is created by filling the slot with a metallic conductor, in an advantageous variation the conduction layer may be produced by immersing the carbon molding with at least one slot formed in it, into a metal bath. During this process, it is possible to use only partial surface area of the flank to create the conduction layer, or to fill the slot completely with the metal conductor depending on whether the at least one slot is kept continuously open or whether one slot flank is covered.

In order to define the surfaces intended for creating a conduction layer unambiguously, it is advantageous to apply masking means to the carbon molding.

In order to form the at least one slot in the carbon molding, an abrasive process may be used, for example, in which the creation of the at least one slot particularly by means of a water jet cutting process is advantageous.

Preferred embodiments of the sliding element and preferred variants of the method for producing a sliding element will be explained in the following with reference to the drawing.

DETAILED DESCRIPTION OF THE EXAMPLE EMBODIMENTS

Figures 1, 2:
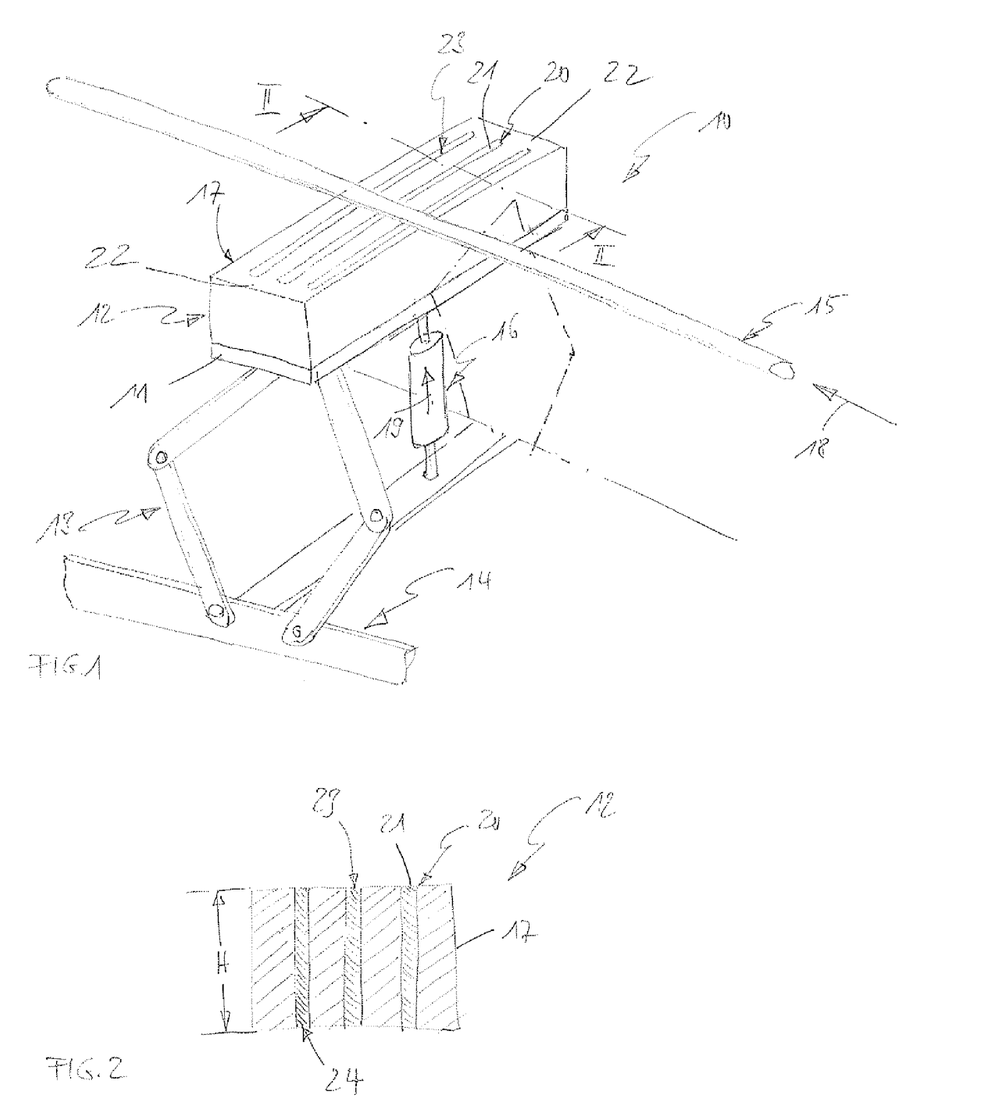
FIG. 1: shows a sliding contact device equipped with a sliding strip in operation.
FIG. 2: shows a cross-section along cross-section line II-II through the sliding strip represented in FIG. 1.

FIG. 1 shows a sliding contact device 10 equipped with a sliding strip 12 on a sliding strip support 11. Sliding contact device 10 has an articulation device 13 that connects sliding strip support 1 to a mounting base 14, which may be arranged on a railcar of a rail vehicle, for example, which is not shown in greater detail here. In order to create a bias with which sliding strip 12 may be pressed resiliently against an overhead wire 15 suspended lengthwise above sliding strip 12, sliding contact device 10 has a biasing device 16, here in the form of a combination spring/damping device, which acts between mounting base 14 and sliding strip support 11.

The sliding strip 12 shown in FIG. 1 comprises a carbon molding 17 that has slots 20 extending transversely to a sliding direction 18 defined by the longitudinal extension of overhead wire 15 and in the direction of the prestressing force 19 acting on sliding strip 12 created by biasing device 16, which slots are filled with a metallic conductive material 21, such as an alloy of copper or aluminium.

As may be seen clearly from the cross section through sliding strip 12 represented in FIG. 2 in conjunction with the isometric representation of sliding strip 12 in FIG. 1, slots 20 extend for the full height H of sliding strip 12: they are thus conformed continuously in carbon molding 17 in the direction of prestressing force 19. In the lengthwise direction of sliding strip 12, that is to say perpendicular to sliding direction 18 relative to the orientation of sliding strip 12 during operation, slots 20 extend between continuously constructed axial frontal edges 22, 23 of carbon molding 17 so that the formation of slots 20 in carbon molding 17 does not obstruct the construction of carbon molding 17 as a single part.

As may be seen particularly by reviewing FIGS. 1 and 2 together, the metallic conductive material 21 located in slots 20 forms conduction layers 23 whose spatial orientation is determined by the slots 20, which layers are formed in the case of the embodiment of FIG. 2 by a complete filling of slots 20 with the conductive material 21.

Figure 3:
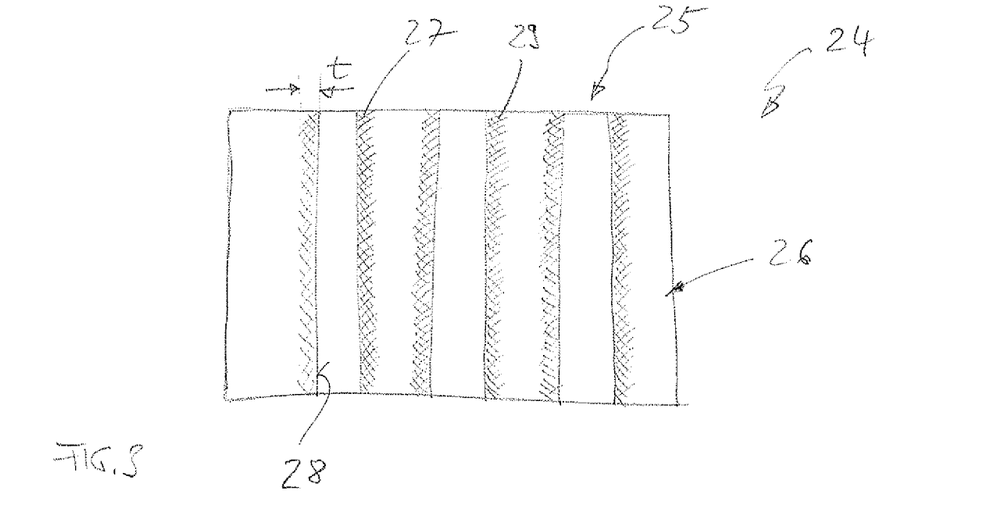
FIG. 3: shows a cross sectional view of a further embodiment of a sliding strip.

FIG. 3 shows a view consistent with that of FIG. 2 of a sliding strip 24 that is furnished with slots 25, the arrangement and design of which correspond to the slots 20 represented in FIGS. 1 and 2. Also consistent with the embodiment of sliding strip 12 described with reference to FIGS. 1 and 2, slots 25 formed in carbon molding 26 that is constructed from a single part.

Unlike sliding strip 12, sliding strip 24 has conduction layers 27 that are formed by impregnation of the flanks 28 of slots 25 with conduction material 29. Due to this impregnation, as shown in FIG. 3, conduction layers 27 are formed in a surface layer of flanks 28 down to a defined penetration depth t. In contrast to the illustration of FIG. 3 this may additionally result in the formation of a layer structure on flanks 28, particularly if further penetration by a metallic conductive material into the surface of carbon molding 26 is blocked by an impregnation penetrating the surface of flanks 28 and then when loading of the flanks 28 with conduction material is resumed a corresponding layer structure is formed on flanks 28.

Figure 4:
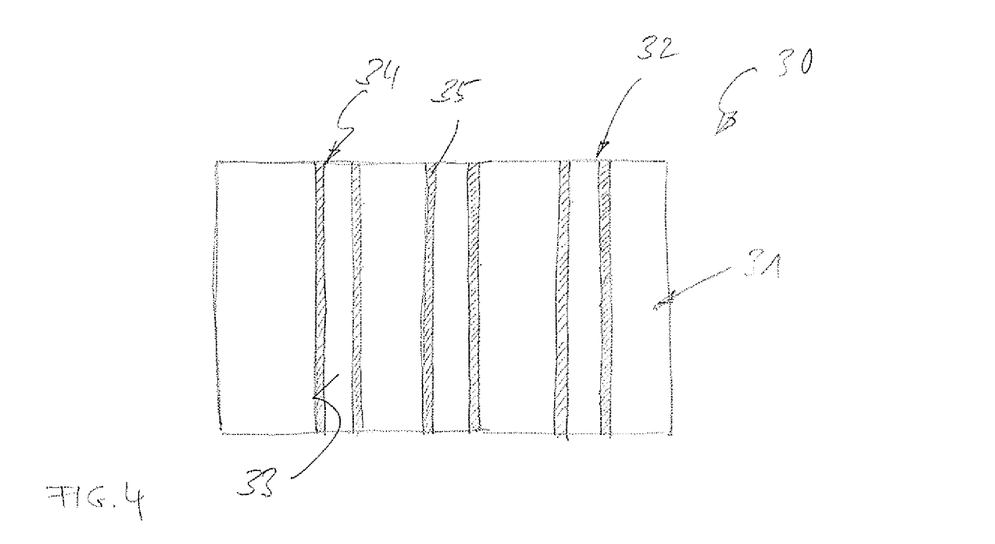
FIG. 4: shows a cross sectional view of another embodiment of a sliding strip.

FIG. 4 shows a further embodiment of a sliding strip 30 that is furnished with slots 32 formed in a carbon molding 31, the arrangement and design of such slots corresponding to slots 20 and 25 of sliding strips 12 and 24. Unlike the embodiment of the sliding strip 26 described with reference to FIG. 3, flanks 33 of slots 32 are furnished with conduction layers 34, which are created essentially by depositing a metallic conductive material 35 onto flanks 33. Regardless of the respective embodiment of the sliding strips 12, 25 or 30 with conduction layers 23, 27 or 34, the conduction layers are similar to the extent that they form layers with defined spatial dimensions and orientation in or on carbon molding 17, 26 or 31, which have increased electrical conductivity compared with the carbon environment defined by the carbon molding.

Figure 5:
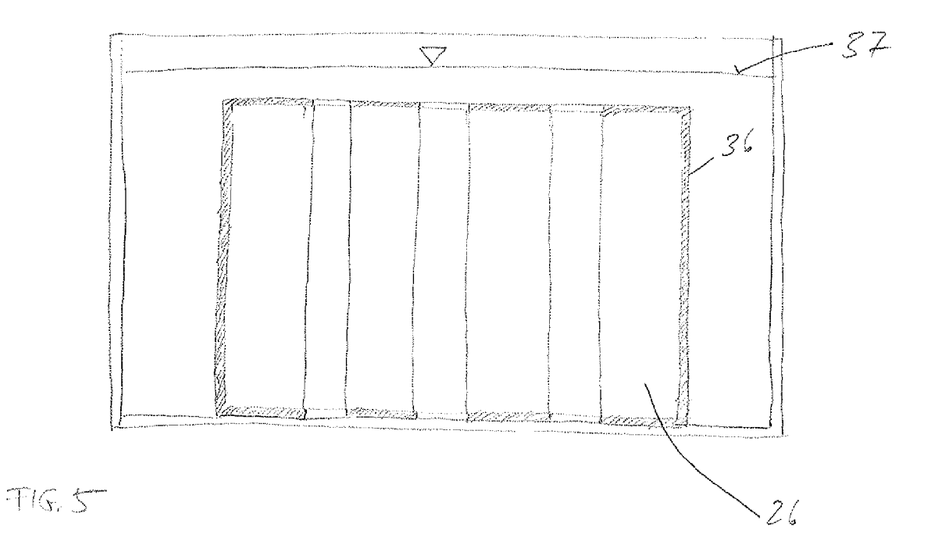
FIG. 5: shows a carbon molding arranged in a metal bath for the purpose of manufacturing a sliding strip.

FIG. 5 shows an option for manufacturing the sliding strip 24 represented in FIG. 3, in which carbon molding 26 except for flanks 28 is covered with surface masking 36 and then immersed in a metal bath 37. The conduction layers 27 represented in FIG. 3 then form down to the desired penetration depth t according to the immersion duration and composition of metal bath 37.

Figure 6:
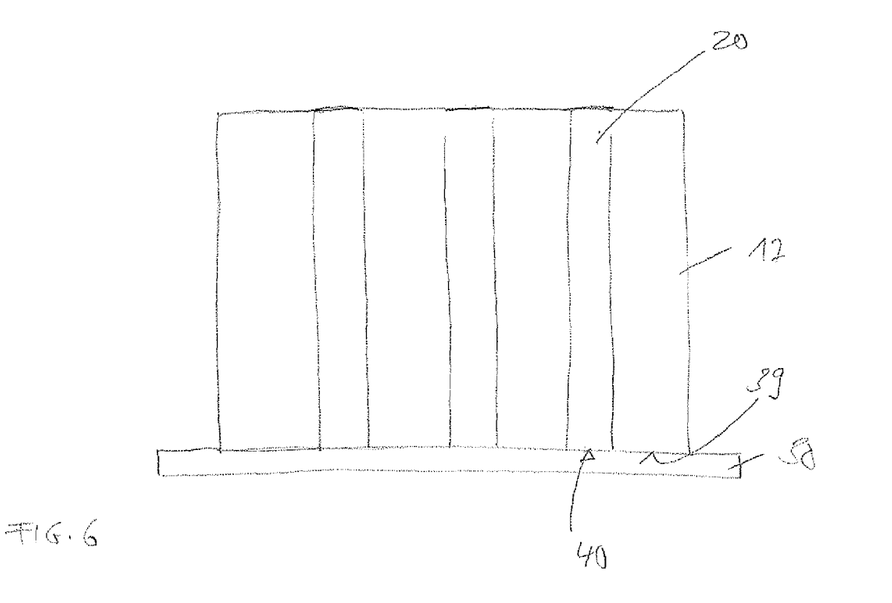
FIG. 6: shows a carbon molding arranged in a filling station for the purpose of manufacturing a sliding strip.

FIG. 6 shows an option for manufacturing the sliding strip 12 represented in FIGS. 1 and 2, in which carbon molding 17 is positioned on a sealing plate 38 in such manner that opening cross sections 40 of the slots 20 arranged on an underside 39 of the carbon molding are covered in liquid-tight manner by scaling plate 38, so that when slots 20 are tilled subsequently, slices that constitute the conduction layers 32 form in slots 20.

Figure 7:
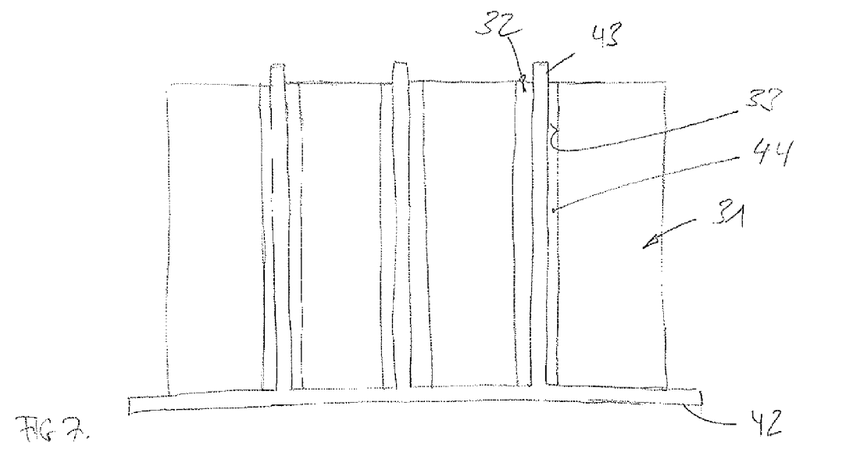
FIG. 7: shows an alternative design of a filling station.
Figure 8:
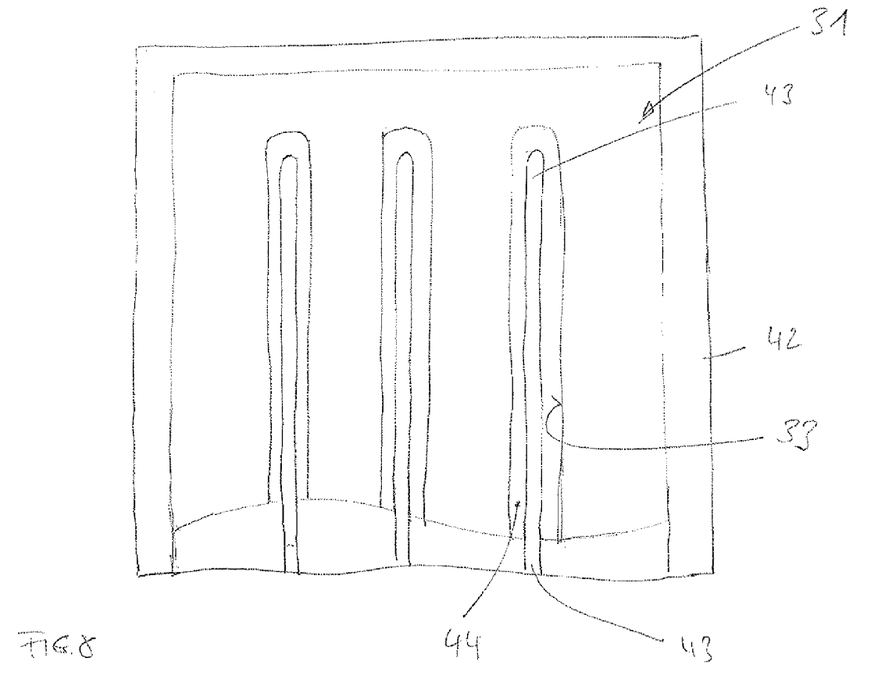
FIG. 8: shows a plan view of an alternative design of a filling station.

FIGS. 7 and 8 show an option for manufacturing the sliding strip 30 represented in FIG. 4, in which carbon molding 31 is positioned on a sealing plate 42 with core bars 43 that engage in the slots 32 in such manner that filling cavities 44 are formed between core bars 43 and the flanks 33 of slots 32 that face them, in such manner that, after tilling cavities 44 have been filled with liquid conduction material 35 (FIG. 4) and the conduction material 35 has solidified, the conduction layers 34 represented in FIG. 4 are created on flanks 33.

Figure 9:
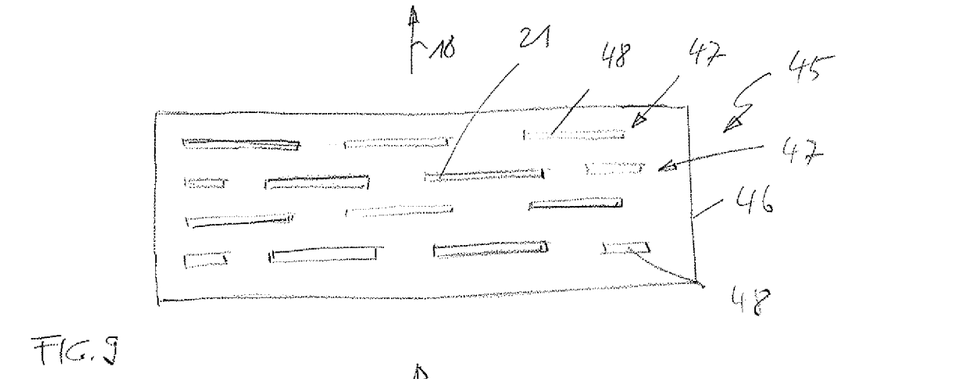
FIG. 9: shows a sliding strip with multiple rows of slots.

FIG. 9 shows a plan view of a sliding strip 45 having multiple rows of slots 47, in this case arranged parallel to each other and extending in the longitudinal direction of a carbon molding 46, each row including slots 48 furnished with conduction material 21 and preferably arranged at equal distances from each other. The slots 48 of adjacent slot rows 47 are arranged with an offset relative to each other, so that in combination the slots provide complete coverage of the surface of the sliding strip in sliding direction 18.

Figure 10:
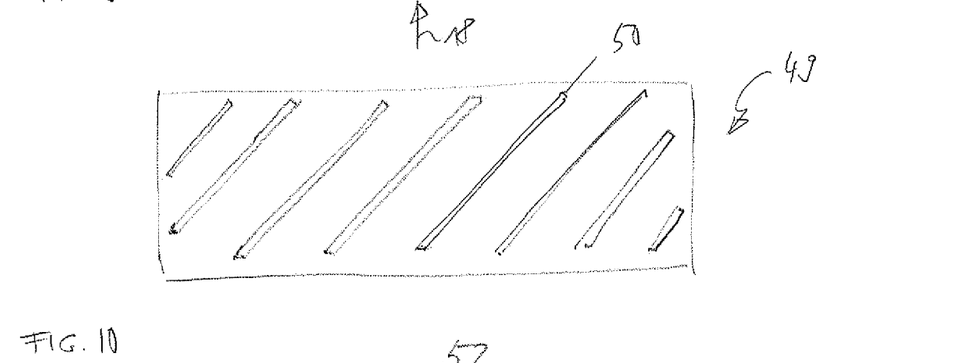
FIG. 10: shows a sliding strip with diagonally extending slots.

FIG. 10 shows a sliding strip 49 having slots 50 that are aligned at an angle to sliding direction 18, wherein the slots also provide complete coverage of the surface of the sliding strip in sliding direction 18.

Figure 11:
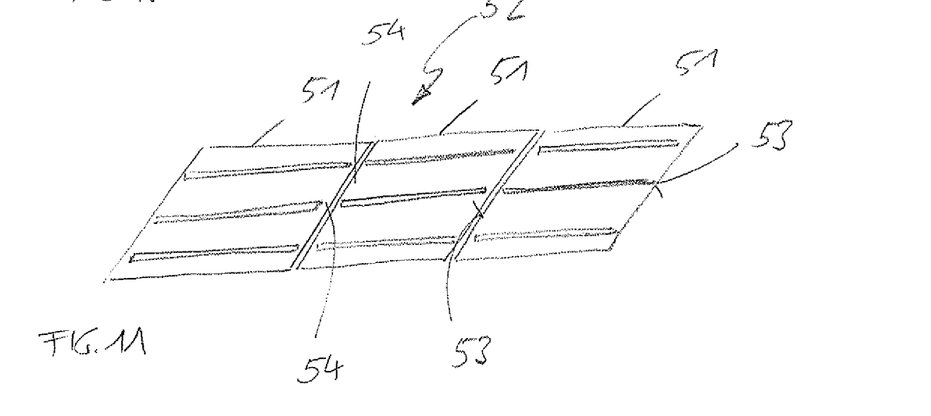
FIG. 11: shows a sliding strip composed of multiple sliding strip segments.

FIG. 11 represents a sliding strip 52 composed of a plurality of sliding strip segments 51, wherein each of the segments is furnished with frontal edges 53 extending at an angle to sliding direction 18, in such manner that segment ends 54 overlap each other in sliding direction 18.

The invention claimed is:

1. A sliding strip for a sliding contact device that rests in a prestressed manner against an overhead wire, particularly for supplying electrical power to rail vehicles, said sliding strip comprising:
    a carbon molding including at least one slot extending transversely to a sliding direction, said at least one slot having a first flank opposing a second flank; and
    at least one metallic conduction device that is arranged in the carbon molding in order to locally increase electrical conductivity, wherein the conduction device has at least one conduction layer that extends in a plane transverse to a sliding direction and in a direction of a biasing force, said at least one conduction layer being formed by a layer of a metallic conductive material arranged on said first flank of said at least one slot and defining a gap between said conductive material and said second flank of said at least one slot.

2. The sliding strip according to claim 1, in which the at least one slot is formed between two continuously conformed frontal edges of the carbon molding extending in the sliding direction.

3. The sliding strip according to claim 1, in which the conduction layer is formed by impregnating the first flank of the at least one slot with a metallic conductive material.

4. The sliding strip according to claim 1, in which the conduction layer is formed by coating the first flank of the at least one slot with a metallic conductive material.

5. The sliding strip according to claim 1, in which the conduction layer is formed by depositing a metallic conductive material into the at least one slot.

6. The sliding strip according to claim 1, in which the metallic conductive layer consists essentially of aluminium or copper.

7. The sliding strip according to claim 1, in which the at least one slot is conformed continuously in the carbon molding in the direction of the prestressing force.

8. The sliding strip according to claim 1, in which the carbon molding has a plurality of slots extending in a longitudinal direction of the carbon molding.

9. The sliding strip according to claim 8, in which the carbon molding has a plurality of slot rows each of which has a plurality of slots extending in the longitudinal direction of the carbon molding.

10. The sliding strip according to claim 1, in which the carbon molding has a plurality of slots aligned parallel to each other and diagonally to a longitudinal direction of the carbon molding.

11. The sliding strip according to claim 1, in which the sliding strip is made up of a plurality of sliding strip segments, which have frontal edges aligned at an angle to the sliding direction to form segment ends that overlap each other in the sliding direction.

12. A method for manufacturing a sliding strip for a sliding contact device that rests in prestressed manner against an overhead wire, particularly for supplying electrical power to rail vehicles, having a carbon molding and at least one metallic conduction device that is arranged in the carbon molding, in order to locally increase electrical conductivity, said method comprising:
    forming at least one slot extending transversely to a sliding direction and in a direction of a prestressing force in the carbon molding; and
    providing at least one flank of the at least one slot with a conduction layer, said conductive material defining a gap between said conductive material and a second flank of said at least one slot opposing said first flank.

13. The method according to claim 12, in which in order to provide the conduction layer, a metallic conductive material is applied to the first flank.

14. The method according to claim 12, in which in order to provide the conduction layer, a metallic conductive material is deposited into the at least one slot.

15. The method according to claim 12, in which in order to provide the conduction layer, the carbon molding furnished with at the least one slot is immersed in a metal bath.

16. The method according to claim 12, in which the carbon molding is covered with a masking means in order to define the surface to be coated.

17. The method according to claim 12, in which the at least one slot is formed in the carbon molding by an abrasive process.

\* \* \* \* \*

UNITED STATES PATENT AND TRADEMARK OFFICE
CERTIFICATE OF CORRECTION

| | | |
|---|---|---|
| PATENT NO. | : 9,061,593 B2 | |
| APPLICATION NO. | : 13/640185 | |
| DATED | : June 23, 2015 | |
| INVENTOR(S) | : Hans Rastl et al. | |

It is certified that error appears in the above-identified patent and that said Letters Patent is hereby corrected as shown below:

In the specification,

Column 5, line 40
"scaling" should be --sealing--

Column 5, line 40
"tilled" should be --filled--

Column 5, line 48
"tilling" should be --filling--

Signed and Sealed this
Fifth Day of January, 2016

Michelle K. Lee
*Director of the United States Patent and Trademark Office*